(12) United States Patent  (10) Patent No.: US 6,701,907 B2
Christopher et al.  (45) Date of Patent: Mar. 9, 2004

(54) SPRING LOADED FEED MECHANISM FOR PAINTBALL LOADER (75) Inventors: James T. Christopher, Garland, TX (US); Chris T. Goddard, Lewisville, TX (US)

(73) Assignee: National Paintball Supply, Inc., Sewell, NJ (US)

(*) Notice: Subject to any disclaimer, the term of this patent is extended or adjusted under 35 U.S.C. 154(b) by 0 days.

(21) Appl. No.: 10/092,220

(22) Filed: Mar. 6, 2002

(65) Prior Publication Data
US 2002/0092513 A1 Jul. 18, 2002

Related U.S. Application Data (63) Continuation-in-part of application No. 09/949,440, filed on Sep. 7, 2001, which is a continuation-in-part of application No. 09/689,573, filed on Oct. 12, 2000, which is a continuation-in-part of application No. 09/465,440, filed on Dec. 16, 1999, now Pat. No. 6,213,110.

(51) Int. Cl.[7] .................................................. F41A 9/61
(52) U.S. Cl. ............................ 124/48; 124/49; 124/50; 89/33.16; 89/33.17
(58) Field of Search ............................... 124/48, 49, 50; 89/33.16, 33.17

(56) References Cited

U.S. PATENT DOCUMENTS

| 4,819,609 | A | * | 4/1989 | Tippmann |
| 4,986,251 | A | * | 1/1991 | Lilley |
| 5,456,153 | A | * | 10/1995 | Bentley et al. |
| 5,561,258 | A | * | 10/1996 | Bentley et al. |
| 5,600,083 | A | * | 2/1997 | Bentley et al. |
| 5,722,383 | A | * | 3/1998 | Tippmann et al. |
| 5,816,232 | A | * | 10/1998 | Bell ........................ 124/51.1 |
| 5,954,042 | A | * | 9/1999 | Harvey |
| 6,220,237 | B1 | * | 4/2001 | Johnson et al. |
| 6,305,367 | B1 | * | 10/2001 | Kotsiopoulos et al. ........ 124/49 |
| 6,327,953 | B1 | * | 12/2001 | Andresen |
| 6,347,621 | B1 | * | 2/2002 | Guthrie |

* cited by examiner

Primary Examiner—Michael J. Carone
Assistant Examiner—Troy Chambers
(74) Attorney, Agent, or Firm—Drinker Biddle & Reath LLP (57) ABSTRACT A spring-loaded feed mechanism for a paintball loader. The feed mechanism includes an inner spool and an outer spool. A torsion spring is positioned between the inner and outer spools. The outer spool includes a pressure wall, from which the torsion spring is located on one end of the spring. A retaining wall is attached to the inner spool and is located at the opposite end of the torsion spring. When an operator of a paintball gun using the spring-loaded feed mechanism discontinues firing paintballs, the feed mechanism is stopped. Simultaneously, during the deceleration of the feed mechanism, the torsion spring is compressed, which allows the mechanical energy of the rotating feed mechanism to be stored within the compressed spring. When the operator desires to fire the paintball gun, the feed mechanism is accelerated to the requisite rotational speed. The compressed spring is release, thereby allowing the spring to assist in accelerating the feed mechanism to the necessary rotational speed.

28 Claims, 9 Drawing Sheets

SPRING LOADED FEED MECHANISM FOR PAINTBALL LOADER

RELATED APPLICATIONS

This application is a continuation-in-part of a co-pending U.S. patent application Ser. No. 09/949,440, entitled "Drive Cone for Paintball Loader," filed Sep. 7, 2001 in the names of James T. Christopher and Chris T. Goddard, which is a continuation-in-part of U.S. patent application Ser. No. 09/689,573, entitled "Rapid Feed Paintball Loader With Pivotable Deflector," filed Oct. 12, 2000 in the names of James T. Christopher and Albert G. Schilling, which is a continuation-in-part of U.S. patent Ser. No. 09/465,440, filed Dec. 16, 1999 in the names of James T. Christopher and Albert G. Schilling and now U.S. Pat. No. 6,213,110, which is hereby incorporated in its entirety by reference herein.

BACKGROUND OF THE INVENTION

1. Technical Field of the Invention

This invention relates to paintball loaders, and more particularly, to a spring-loaded feed mechanism feeding paintballs into a paintball gun.

2. Description of Related Art

Games utilizing paintball guns have increased in popularity over the past few years. Players of these games normally shoot paintballs at each other through paintball guns. The paintballs are gelatin-covered spherical capsules filled with paint. During play of the game, the players on each team advance toward each other. A player is eliminated from the game when the player is hit by a paintball fired from an opposing player's gun. When the paintball hits a player, a "splat" of paint is left on the player.

Normally an existing paintball loader includes a housing which is placed on an upper portion of a paintball gun. The housing is shaped to hold a large quantity of paintballs. At the bottom of the housing is an outlet tube through which the paintballs drop by the force of gravity. The outlet tube leads to an inlet tube located on the upper portion of the gun.

During the operation of existing paintball loaders, paintballs sequentially drop by gravity through the outlet tube into the inlet tube of the gun. The inlet tube directs each paintball into the firing chamber of the gun, where the paintball is propelled outwardly from the gun by compressed air.

The paintball gun and accessories have increased in performance and complexity over the years. Players demand high rates of fire of paintballs from the paintball guns with little or no jamming. However, existing paintball guns are limited in how fast they can accelerate to a rapid firing rate by the performance of the motor driving the paintball loader. In addition, if a loader is feeding paintballs at a high rate of balls per second, when the paintball gun discontinues firing, the loader rate of feeding paintballs must be immediately stopped, primarily through a braking mechanism to instantly stop the rotation of the loader. But such abrupt changes in the loader's rotation rate oftentimes results in paintball jams, as well as subjecting the paintball loader to undesirable forces. A paintball loader is needed which efficiently converts the mechanical energy present at a high feed rate into potential energy for use by the loader during rapid startups. A paintball loader is specifically needed which utilizing a spring-loaded feed mechanism within the paintball loader to increase the performance of the loader.

Co-pending U.S. patent application Ser. No. 09/689,573 ('573) describes a paintball feed system providing enhanced performance over existing paintball feed systems. Additionally, '573 discloses a paintball loader which reliably and forcibly delivers paintballs to a paintball gun at a rapid, selectable rate, while actively preventing paintball jams. The paintball loader utilizes a drive cone to actively feed the paintballs to the paintball gun. However, when paintballs are no longer required to be fed to the paintball gun, the drive cone must be immediately stopped through the use of a braking mechanism. The braking mechanism rapidly slows the rotation of the drive cone, which subjects the drive cone to undesirable forces. These forces cause wear and tear on the paintball loader. Additionally, when an operator wishes to immediately fire paintballs at a fast rate, the drive cone must accelerate from a stationary position to a high rotation speed. Obviously, the time necessary to accelerate to a high rotational rate is limited by the torque provided by the motor driving the drive cone. Over-driving of a feed mechanism may also introduce undesirable forces on the paintballs located within the loader, resulting in paintball breakage or jams.

It would be a distinct advantage to have an apparatus which increases the performance of the paintball loader by decreasing the acceleration time necessary to rotate the drive cone at a high rate, while deceasing the undesirable forces on the loader when stopping the rotation of the drive cone. It would also be advantageous to have a mechanism which can be used in any paintball loader, enabling the simple modification of the feed mechanism used by the paintball loader. It is an object of the present invention to provide such an apparatus.

SUMMARY OF THE INVENTION

In one aspect, the present invention is a feed mechanism for use on a paintball loader. The feed mechanism includes an axial member longitudinally positioned about a center axis. The axial member is rotated by a motor. In addition, a spring communicates with the axial member. The spring compresses during rotational deceleration of the axial member and assists in the rotational acceleration of the axial member.

In another aspect, the present invention is a feed mechanism for use on a paintball loader. The feed mechanism includes an agitating device for feeding paintballs from the paintball loader to a paintball gun and a spring communicating with the agitating device. The spring is compressed when the agitating device is rotationally decelerated and released to assist in the rotational acceleration of the agitating device prior to the initiation of the rotation of the agitating device.

In still another aspect, the present invention is a rapid feed paintball loader for use on a paintball gun. The paintball loader includes a container for holding a plurality of paintballs, a feed mechanism rotatably mounted on a bottom portion of the container and at least one fin affixed to the feed mechanism. A motor is used to rotate the feed mechanism. An exit tube exits from the bottom portion of the container and leads to an inlet tube of the paintball gun. A spring is contained within the feed mechanism. The spring compresses during rotational deceleration of the feed mechanism and releases to expand prior to acceleration of the feed mechanism.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
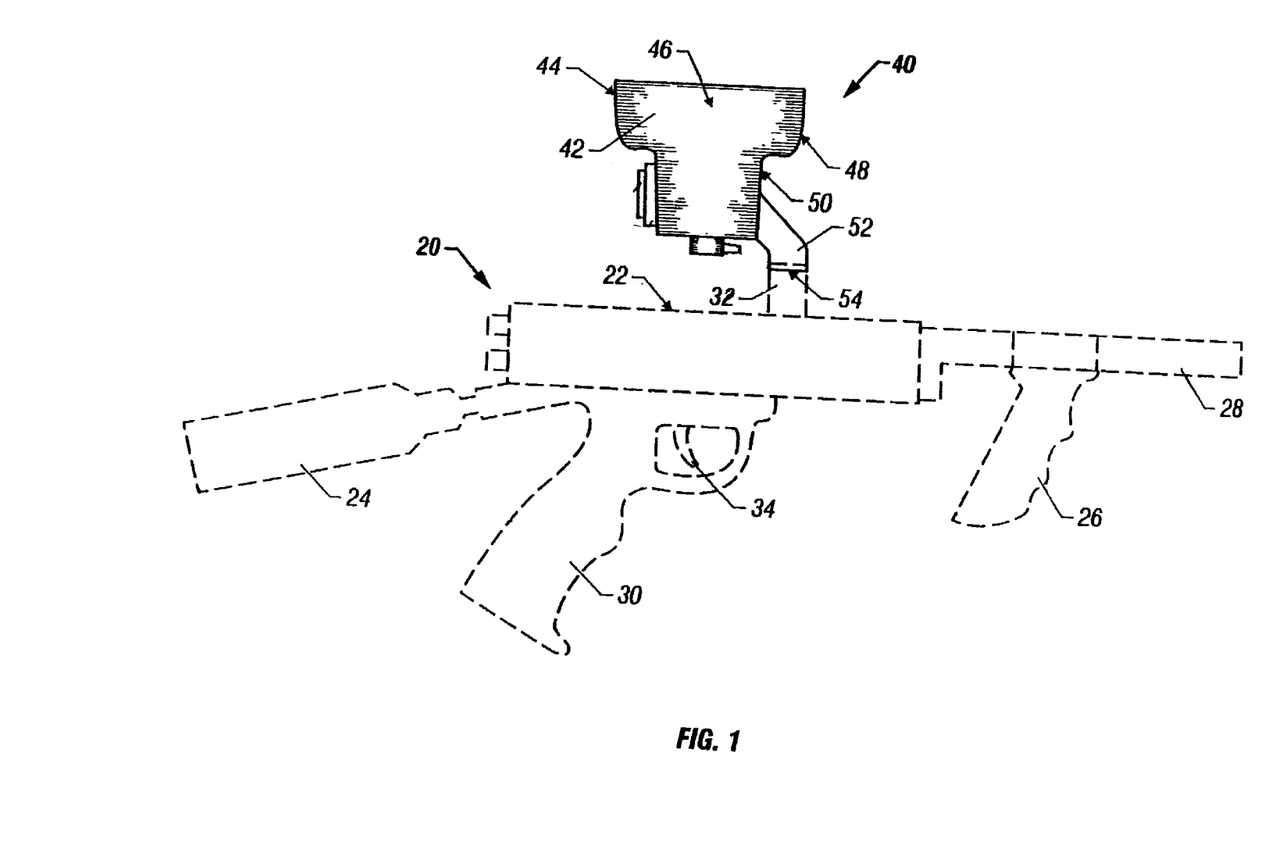
FIG. 1 is a side elevational view of a rapid feed paintball loader constructed in accordance with the teachings of the present invention and operatively attached to a representative paintball gun illustrated in phantom.

A spring-loaded feed mechanism for use on a paintball loader for rapidly delivering paintballs is disclosed. FIG. 1 is a side elevational view of a rapid feed paintball loader 40 constructed in accordance with the teachings of the present invention and operatively attached to a representative paintball gun 20 illustrated in phantom. The paintball gun 20 includes a main body 22, a compressed gas cylinder 24, a front handgrip 26, a barrel 28, and a rear handgrip 30. The paintball gun also includes an inlet tube 32 leading to a firing chamber (not shown) in the interior of the main body and a trigger 34. The front handgrip projects downwardly from the barrel and provides an area for gripping by an operator of the paintball gun. The compressed gas cylinder is typically secured to a rear portion of the paintball gun. The compressed gas cylinder normally contains $CO_2$, although any compressible gas may be used.

In operating the paintball gun 20, the trigger 34 is squeezed, thereby actuating the compressed gas cylinder to release bursts of compressed gas. The bursts of gas are used to eject paintballs outwardly through the barrel 28. The paintballs are continually fed by the paintball loader 40 through the inlet tube to the firing chamber. Although FIG. 1 depicts an automatic paintball gun, the paintball gun 20 may also be a semi-automatic gun.

The rapid feed paintball loader 40 includes a paintball container 42 having a container wall 44 forming an interior area 46. The container is divided into an upper portion 48 and a lower portion 50. An exit tube 52 leads from the bottom portion of the container to an outlet opening 54. The exit tube is positioned on top of the inlet tube 32 of the paintball gun 20.

Figure 2:
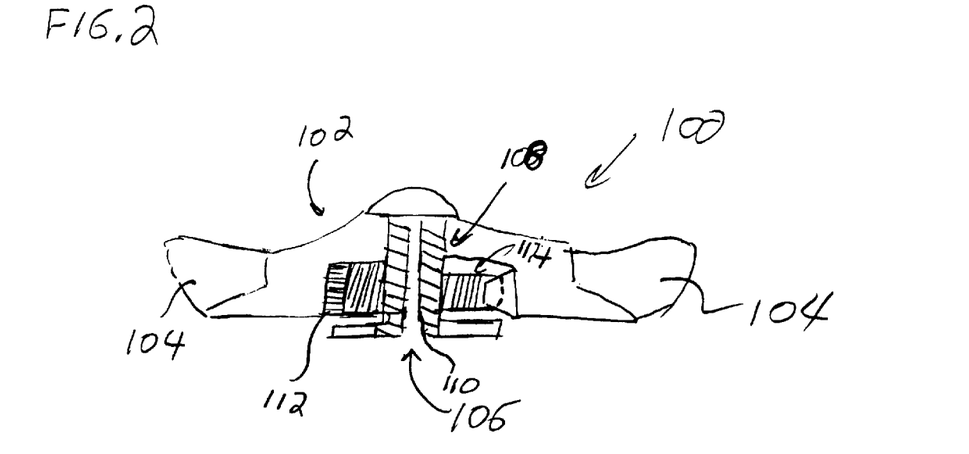
FIG. 2 is a side view illustrating an interior portion of a feed mechanism in the preferred embodiment of the present invention.

FIG. 2 is a side view illustrating an interior portion of a feed mechanism 100 in the preferred embodiment of the present invention. The feed mechanism may be any device which feeds paintballs into the paintball gun 20. As illustrated, a drive cone 102 is shown. The drive cone includes fins 104 which drives paintballs into the exit tube 52. The drive cone includes a cylindrical opening 106 running longitudinally down a center portion of the drive cone. The drive cone is positioned over an axial member 108. The axial member includes an inner spool 110 and an outer spool 112. A spring chamber 114 providing a circular void between the inner and outer spools is used to house a spring 116. Affixed to an interior outer spool wall 118 is a pressure wall 120. On an outer inner spool wall 122 is affixed a retaining wall 124.

Figure 7:
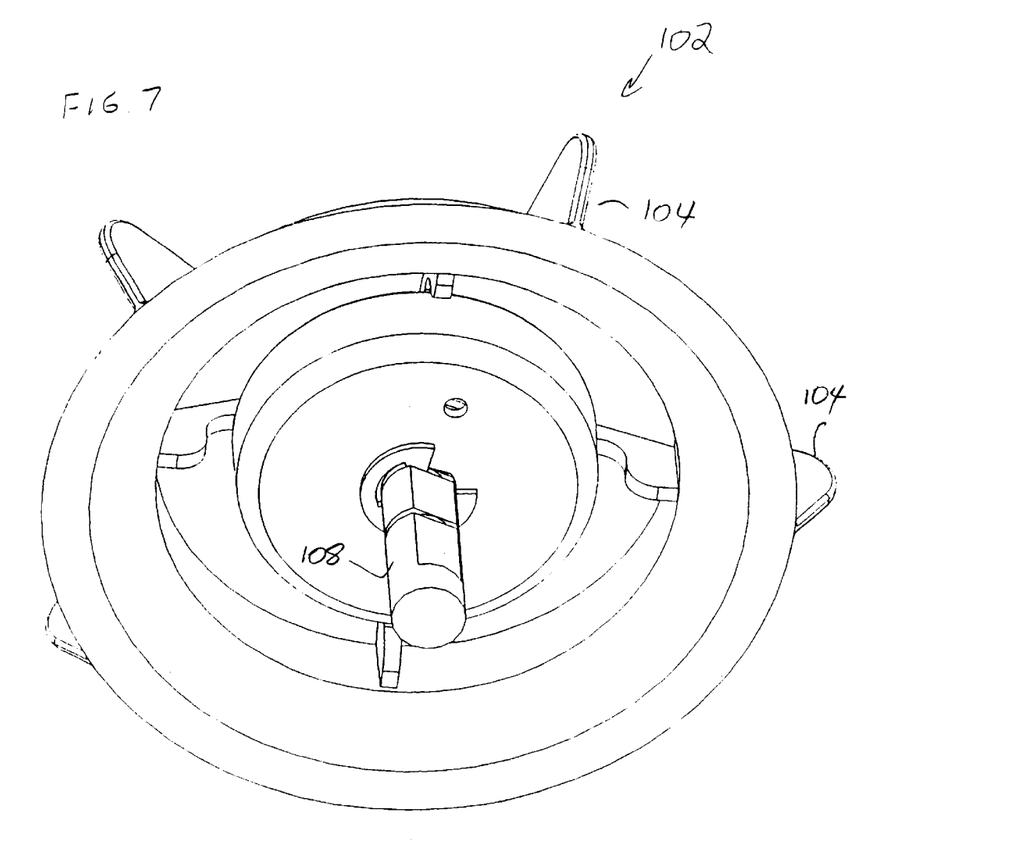
FIG. 7 is a bottom perspective view of the drive cone of FIG. 2.
Figure 8:
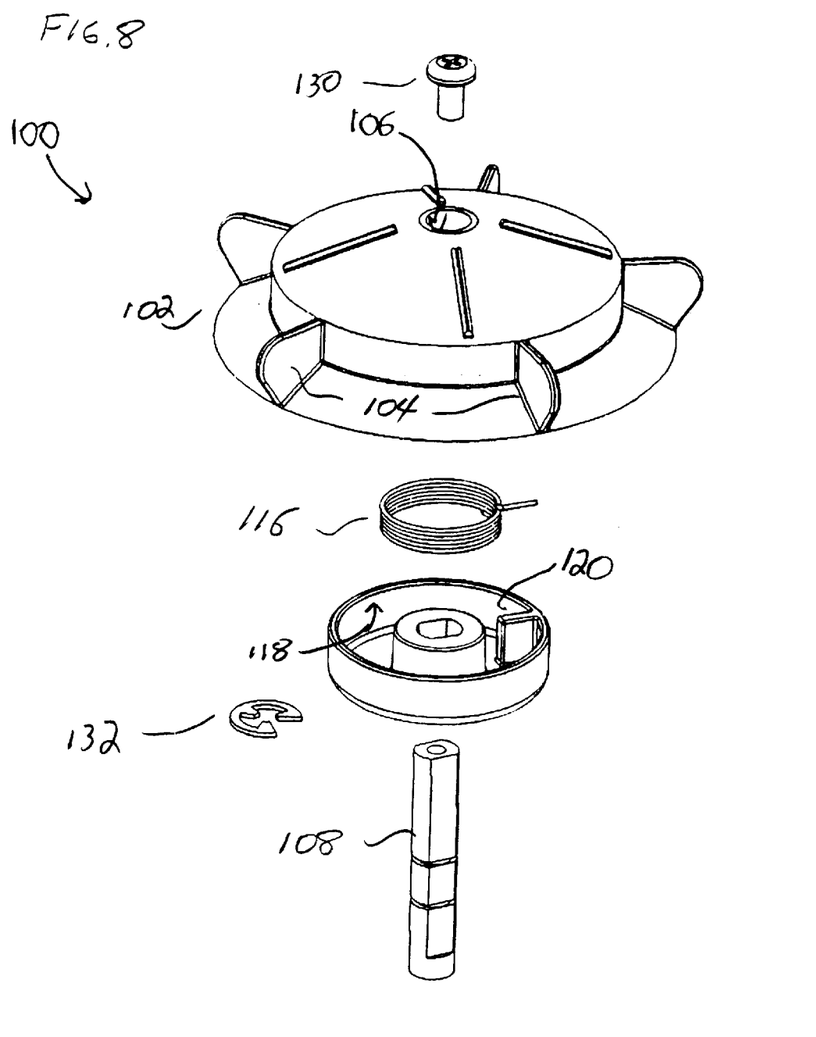
FIG. 8 is an exploded front perspective view of the feed mechanism of FIG. 2.
Figure 9:
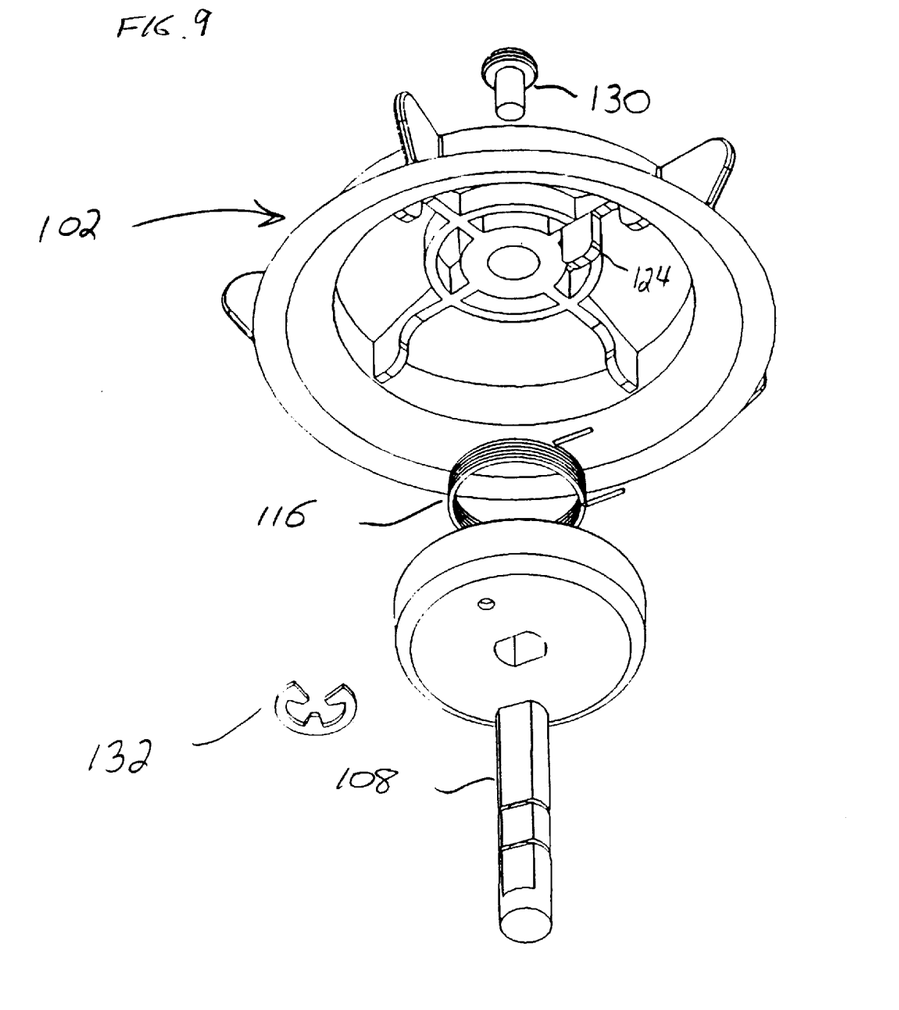
FIG. 9 is an exploded bottom perspective view of the feed mechanism of FIG. 2.

FIG. 7 is a bottom perspective view of the drive cone 102 of FIG. 2. FIG. 8 is an exploded front perspective view of the feed mechanism 100 of FIG. 2. An attachment bolt 130 is used to affix the drive cone to the axial member 108. In addition, a collar 132 is positioned around the axial member. FIG. 9 is an exploded bottom perspective view of the feed mechanism of FIG. 2.

Figure 3:
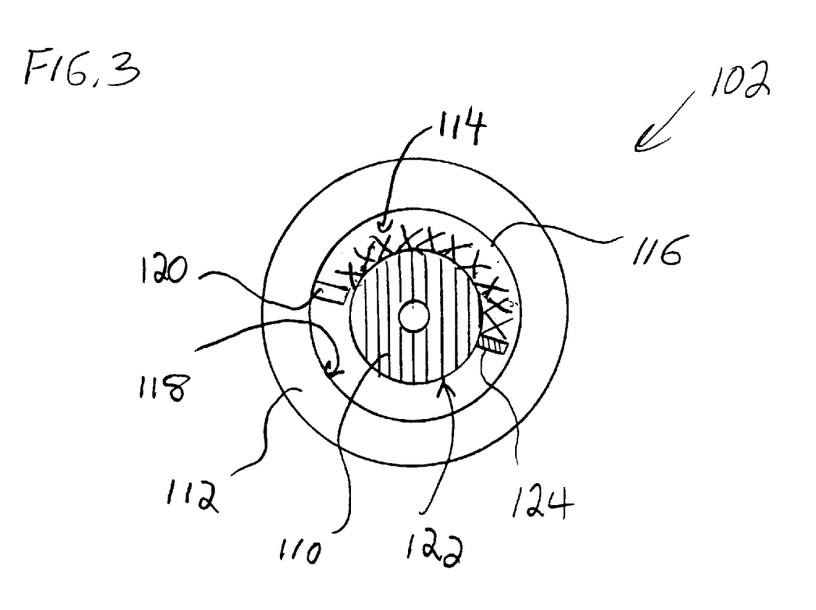
FIG. 3 is a top cross section view of the drive cone of FIG. 2.

FIG. 3 is a top cross section view of the drive cone 102 of FIG. 2. The inner spool 110 may rotate separate, as well as in an opposite direction, from outer spool 112. The outer spool may be held in a stationary position by tension created by paintballs positioned between the fin's 104 when paintballs and loader are dormant. During this phase of operation, the inner spool may be rotated in a counter-clockwise direction, which causes the retaining wall to compress the spring. The compression of the spring provides storage of the mechanical energy of the rotating drive, thereby storing potential energy for use during rapid rotational acceleration of the drive cone (e.g., stationary to fast a rotational rate).

With reference to FIGS. 1–3 and 7–9, the operation of the feed mechanism 100 will now be explained. When an operator of the paintball gun discontinues firing the paintball gun 20, the trigger 34 is released, causing the drive cone rotation to cease. Prior to the present invention, in order to immediately stop the rotation of the drive cone, a braking mechanism was required to abruptly stop the rotation of the drive cone. However, with the introduction of the spring/axial member assembly described above, the drive cone does not require the same level of braking action from the braking mechanism. As the drive cone decreases its rotation, the outer spool is held in place by the tension placed on the fins 104 by paintballs positioned in gaps between the fins. The inner spool continues to rotate, at a decreasing rate. The pressure wall located on the interior outer spool wall 118 and the retaining wall 124 located on the inner spool wall 122 compress the spring 116. Since the inner spool is allowed to continue rotating for a longer period of time, the braking mechanism need not be applied in such an abrupt manner.

When the operator desires to commence firing the paintball gun, he squeezes the trigger 34, which allows a paintball to enter the breech of the paintball gun. The removal of the paintball allows the release of the spring tension of the spring prior to the rotation of the drive cone. During rapid rotational acceleration of the drive cone, the startup is enhanced by the release of the outer spool, causing the spring 116 to assist in rotationally driving the inner spool in a counter-clockwise fashion. Thus, when the outer spool is released, the retaining wall 124 is rotationally forced in a counter-clockwise direction with the assistance of the spring expanding from its compressed configuration, thus enhancing the acceleration rate of the drive cone.

Figure 4:
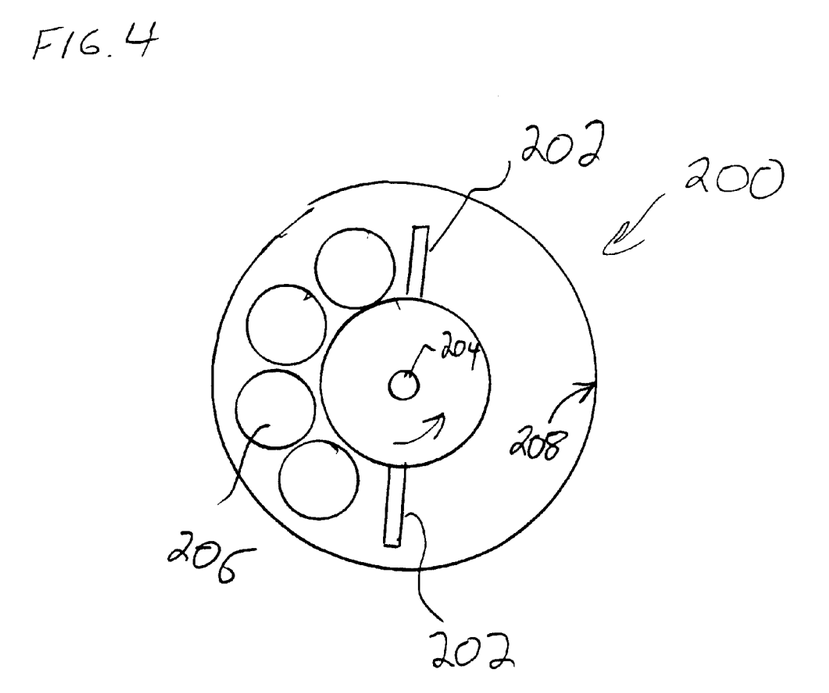
FIG. 4 is a top view of a drive cone having a plurality of fins.

The spring configuration may be utilized by any agitating device for a paintball gun. For example, the dual spools with the spring may be utilized in a drive cone such as that disclosed in patent application Ser. No. 09/949,440. FIG. 4 is a top view of a drive cone 200 having a plurality of fins 202. Preferably, the fins are constructed of elasticized rubber. Most drive cones are rotational driven through a center axis 204 to feed a plurality of paintballs 206 into a paintball gun. A paintball container wall 208 is also illustrated. The drive cone may be modified to include the inner spool 110, the outer spool 112, and the spring assembly located through the center axis 204.

Figure 5:
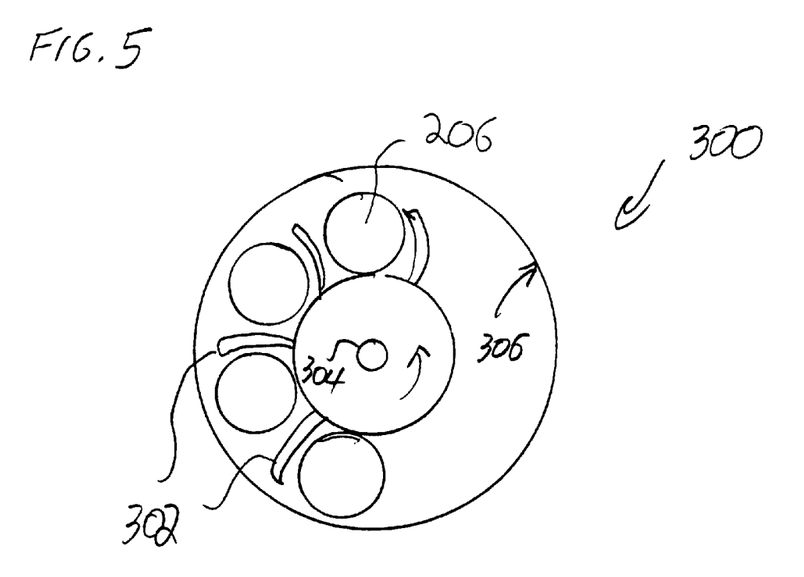
FIG. 5 is a top view of an agitating device having a plurality of paddles.

Likewise, the spring assembly may be utilized in any agitating device. FIG. 5 is a top view of an agitating device 300 having a plurality of paddles 302. The agitating device typically rotates around a center axis 304. The paintballs are rotationally driven into the paintball gun in a similar manner as the drive cone 200 of FIG. 4. In a similar fashion as discussed in FIG. 4, the agitating device may also be modified to incorporate a spring and dual spools.

The present invention may be incorporated on any agitating or feed (gravity or active) mechanism for use in a paintball loader. In particular, the present invention has the advantage of merely requiring the modification of the feed mechanism housed within the paintball container without any additional modifications to the gun, inlet/exit tubes, or the container.

Figure 6:
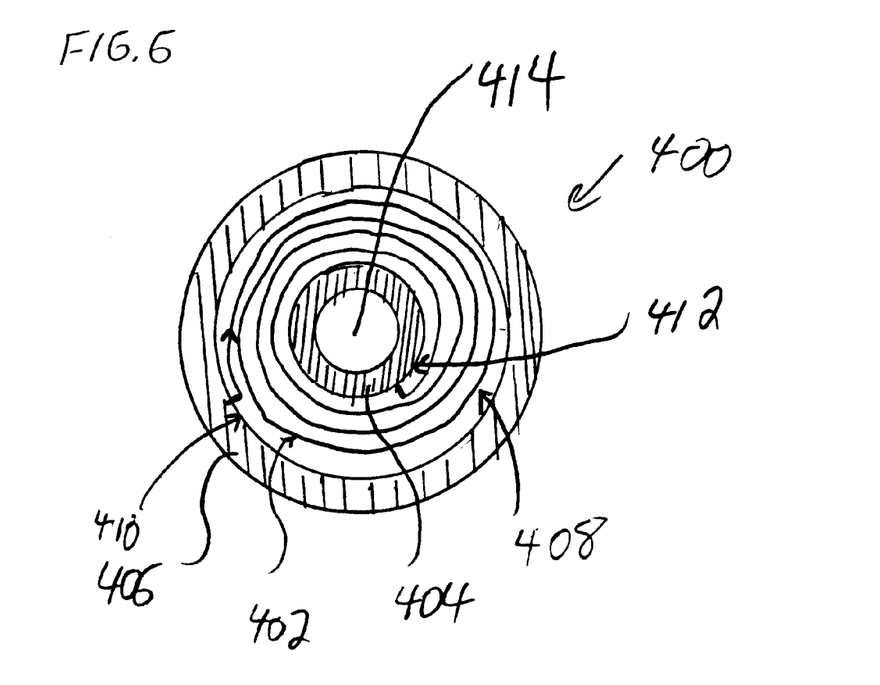
FIG. 6 is a top view of a feed mechanism utilizing a coiled spring in an alternate embodiment of the present invention.

Although a simple torsion spring is illustrated and described above, the spring/dual spool configuration is but one of many different configurations which utilize a spring to store mechanical energy. For example a coiled spring may be utilized. FIG. 6 is a top view of a feed mechanism 400 utilizing a coiled spring 402 in an alternate embodiment of the present invention. The feed mechanism may include an inner spool 404 and an outer spool 406. A spring chamber 408 having a void large enough to accommodate the coiled spring is located between the inner and outer spool. The coiled spring is preferably attached in an outer spool wall 410 on one end of the spring. The coiled spring is then attached to an inner spool wall 412. The coiled spring may be a conventional coil spring which is coiled about a center axis 414.

With reference to FIG. 6, the operation of the coiled spring within the feed mechanism 400 will now be explained. Typically, the feed mechanism is rotated by a motor (not shown) about the center axis 414. When the operator desires to discontinue the firing of paintball gun 20, the operator releases the trigger 34, which removes power from the motor. Rather than employing a braking mechanism to immediately stop the rotation of the feed mechanism, while the outer spool rotation is stopped, the inner spool may be allowed to continue to rotation for a specific angular distance to allow the coiled spring to compress. The compression of the coiled spring allows the spring to store the mechanism energy created during the deceleration of the feed mechanism. This stored energy may then be utilized to rapidly start the rotation of the feed mechanism.

Still referring to FIG. 6, when the operator of the paintball gun 20 desires to fire paintballs, the operator squeezes the trigger 34 of the paintball gun, causing the activation of the motor. The motor rotates the feed mechanism. Since the coiled spring 402 is compressed, the rotational acceleration is increased by the expansion of the coiled spring. Thus, the spring assists the motor in spinning the feed mechanism to the required rotational speed.

Although a coiled spring and a torsion spring are described, it should be understood that any spring may be utilized which stores the rotational energy during the deceleration of the feed mechanism of the paintball loader, as well as releasing the stored energy by allowing the spring to assist in increasing the acceleration rate of the feed mechanism during commencement of rapid fire of the paintball gun.

The present invention provides many advantages over existing paintball loaders. The present invention reduces the undesirable forces sustained by the paintball loader when firing of paintballs ceases from a rapid rate. Existing paintball loaders must utilize a braking mechanism to immediately stop rotation of the feed mechanism. However, by utilizing a spring, the rotation of the feed mechanism is not required to be immediately stopped. Rather, the feed mechanism may be allowed to continue to rotate for a specific angular distance to allow compression of the spring. Thus, the braking mechanism is not required to brake the feed mechanism so abruptly. In addition, the acceleration rate of the feed mechanism is increased when the spring is released during rapid accelerations of the paintball loader. Thus, the performance of the loader is dramatically enhanced.

It is thus believed that the operation and construction of the present invention will be apparent from the foregoing description. While the apparatus shown and described has been characterized as being preferred, it will be readily apparent that various changes and modifications could be made therein without departing from the scope of the invention as defined in the following claims.

What is claimed is:

1. A feed mechanism for use on a paintball loader, the feed mechanism comprising:

an axial member longitudinally positioned about a center axis, said axial member being rotatable by a motor;

a first spool rotatably mounted about the center axis, said first spool being driven by the motor, said first spool including a retaining wall on an exterior wall of the first spool;

a second spool surrounding said first spool, said second spool independently rotatably mounted about the center axis from said first spool, the mounting of the second spool forming a void between said first and second spools, said second spool including a pressure wall located on an interior wall of the second spool;

a spring positioned within the void, said spring being compressed by the pressure wall and the retaining wall, said spring adapted to compress when the agitating device rotationally decelerates, and said spring assisting in the rotational acceleration of the axial member.

2. The feed mechanism of claim 1 wherein said spring assists in the rotational acceleration of the axial member by expanding prior to initiation of the rotation of said axial member.

3. The feed mechanism of claim 1, wherein said spring is a torsion spring, said torsion spring having a first end and an opposite second end.

4. The feed mechanism of claim 1, wherein said spring is a coil spring wrapped around the first spool, said coil spring having a first end adjacent an exterior wall of the first spool and an opposite second end adjacent an interior wall of the second spool.

5. The feed mechanism of claim 1 further comprising a drive cone positioned over said axial member.

6. The feed mechanism of claim 1 further comprising an agitating device positioned over said axial member.

7. The feed mechanism of claim 6 wherein the agitation device includes a plurality of elasticized fins.

8. A feed mechanism for use on a paintball loader, the feed mechanism comprising:

an agitating device for feeding paintballs from the paintball loader to a paintball gun, said agitating device including an axial member longitudinally positioned about a center axis, said axial member being rotatable by a motor;

a first spool rotatably mounted about the center axis, said first spool being driven by the axial member, said first spool including a retaining wall on an exterior wall of the first spool;

a second spool surrounding said first spool, said second spool adapted to independently rotate about the center axis relative to said first spool, said second spool forming a void between said first and second spools, a pressure wall located on an interior wall of the second spool, said spring being compressed by the pressure wall and the retaining wall;

a spring positioned within the void, said spring adapted to compress when the agitating device rotationally decelerates, and whereby said spring releases and assists in the rotational acceleration of the agitating device prior and during initiation of the rotation of the agitating device.

9. The feed mechanism of claim 8, wherein said spring is a coil spring wrapped around the first spool, said coil spring having a first end adjacent an exterior wall of the first spool and an opposite second end adjacent an interior wall of the second spool.

10. The feed mechanism of claim 8, wherein the agitation device includes a plurality of elasticized fins.

11. A rapid feed paintball loader for use on a paintball gun, the paintball loader comprising:

a container for holding a plurality of paintballs;

a feed mechanism rotatably mounted on a bottom portion of said container;

at least one fin affixed to said feed mechanism;

said feed mechanism including an axial member, a first spool engaged with the axial member for rotating in combination with the axial member about a center axis, said axial member and said first spool being driven by the motor, and a second spool surrounding at least a portion of said first spool, said second spool being independently rotatable about the center axis relative to said first spool, a void located between said first and second spools, and a spring positioned within the void;

a motor adapted to rotate said axial member of said feed mechanism;

an exit tube exiting from the bottom portion of said container and leading to an inlet tube of the paintball gun;

means for actuating said motor upon demand;

said first spool including a retaining wall on an exterior wall of the first spool, said second spool including a pressure wall located on an interior wall of the second spool, said spring being compressed by the pressure wall and the retaining wall, said spring adapted to compress when the agitating device rotationally decelerates, and said spring adapted to release and assist in the rotational acceleration of the agitating device prior and during initiation of the rotation of the agitating device.

12. The feed mechanism of claim 11, wherein said spring is a coil spring wrapped around the first spool, said coil spring attached on a first end to an exterior wall of the first spool and attached on an opposite second end to an interior wall of the second spool.

13. The feed mechanism of claim 11, wherein said fin is an elasticized fin.

14. A feed mechanism for use on a paintball loader, the feed mechanism comprising:

an axial member longitudinally positioned about a center axis, the axial member adapted to engage with and be rotatable by a motor;

a first spool engaged with the axial member so as to be rotatable about the center axis in combination with the axial member;

a second spool positioned adjacent to the first spool, the second spool being mounted so as to be independently rotatable about the center axis relative to the first spool, the mounting of the second spool defining a void between the first and second spools;

a spring positioned within the void, the spring having a first free end and a second free end, the first free end being positioned adjacent but unattached to the first spool, the second free end being positioned adjacent but unattached to the second spool, the first and second free ends adapted to connect with the first and second spools respectively upon activation of the feed mechanism.

15. The feed mechanism of claim 14, wherein the first spool includes a retaining wall on an exterior wall of the first spool, and wherein the second spool includes a pressure wall on an interior wall of the second spool, the first free end of the spring positioned adjacent to and adapted to contact the retaining wall, and the second free end of said spring positioned adjacent to and adapted to contact the pressure wall.

16. The feed mechanism of claim 15, wherein the second spool is formed as the lower surface of a drive cone, said pressure wall extending downwardly from the second spool.

17. The feed mechanism of claim 14, further including a drive cone positioned over said axial member.

18. The feed mechanism of claim 14, further including an agitating device positioned over said axial member.

19. The feed mechanism of claim 18, wherein the agitation device includes a plurality of elasticized fins.

20. A feed mechanism for use on a paintball loader, the feed mechanism comprising:

an agitating device for feeding paintballs from the paintball loader to a paintball gun, said agitating device including an axial member longitudinally positioned about a center axis, said axial member adapted to engage with and be rotatable by a motor;

a first spool rotatably mounted about the center axis, said first spool adapted to rotate in combination with said axial member;

a second spool positioned adjacent to said first spool, said second spool adapted to rotate independently from said first spool, the first and second spools defining a void between them; and a spring positioned within the void, said spring having a first free end and a second free end, said first free end positioned adjacent to said first spool and formed so as to releasably engage with the first spool, said second free end positioned adjacent to said second spool and located so as to releasably engage the second spool.

21. The feed mechanism of claim 20, wherein said first spool includes a retaining wall on an exterior wall of the first spool, and wherein said second spool includes a pressure wall on an interior wall of the second spool, said first free end of said spring is positioned to contact the retaining wall and said second free end of said spring is positioned to contact the pressure wall, wherein the relative movement of said retaining wall and pressure wall with respect to one another controls winding of said spring.

22. The feed mechanism of claim 21, wherein the second spool is formed as the lower surface of a drive cone, said pressure wall extending downwardly from the second spool.

23. The feed mechanism of claim 21, wherein said spring is a coil spring wrapped around the first spool, wherein the first and second free ends are legs that extend radially outward from the coil spring.

24. A rapid feed paintball loader for use on a paintball gun, the paintball loader comprising:
   a container for holding a plurality of paintballs;
   a motor for feeding paintballs;
   an exit tube exiting from the bottom portion of said container and leading to an inlet tube of the paintball gun;
   means for actuating said motor upon demand; and
   a feed mechanism rotatably mounted on a bottom portion of said container, the motor being engaged with the feed mechanism, the feed mechanism including:
      at least one fin affixed to said feed mechanism,
      said feed mechanism including an axial member engaged with the motor,
      a first spool slidably disposed on the axial member for rotating in combination with the axial member,
      a second spool adjacent to the first spool, said second spool adapted to rotate independently from said first spool, the first and second spools defining a void between them, and
      a spring positioned within the void, said spring having a first free end and a second free end, said first free end positioned adjacent to said first spool and formed so as to releasably engage with the first spool, said second free end positioned adjacent to said second spool and located so as to releasably engage the second spool.

25. The feed mechanism of claim 24, wherein said first spool includes a retaining wall on an exterior wall of the first spool, and wherein said second spool includes a pressure wall on an interior wall of the second spool, said first free end of said spring is positioned to contact the retaining wall and said second free end of said spring is positioned to contact the pressure wall, wherein the relative movement of said retaining wall and pressure wall with respect to one another controls winding of said spring.

26. The feed mechanism of claim 25, wherein the second spool is formed as the lower surface of a drive cone, said pressure wall extending downwardly from the second spool.

27. The feed mechanism of claim 25, wherein said spring is a coil spring wrapped around the first spool, wherein the first and second free ends are legs that extend radially outward from the coil spring.

28. The feed mechanism of claim 24, wherein said fin is an elasticized fin.

* * * * *